United States Patent [19]

Bruijns

[11] Patent Number: 5,434,902
[45] Date of Patent: Jul. 18, 1995

[54] IMAGING SYSTEM WITH MEANS FOR COMPENSATING VIGNETTING AND X-RAY EXAMINATION APPARATUS COMPRISING SUCH AN IMAGING SYSTEM

[75] Inventor: Antonius J. C. Bruijns, Eindhoven, Netherlands

[73] Assignee: U.S. Philips Corporation, New York, N.Y.

[21] Appl. No.: 32,064

[22] Filed: Mar. 17, 1993

[30] Foreign Application Priority Data

Mar. 17, 1992 [EP] European Pat. Off. ............ 92200761
Mar. 17, 1992 [EP] European Pat. Off. ............ 92200762
Oct. 26, 1992 [EP] European Pat. Off. ............ 92203278

[51] Int. Cl.6 .............................................. H05G 1/64
[52] U.S. Cl. ..................................... 378/98.7; 378/62; 364/413.13
[58] Field of Search ................. 378/62, 98.3, 98.7; 364/413.13

[56] References Cited

U.S. PATENT DOCUMENTS

| 4,287,536 | 9/1981 | Wiggins | 358/282 |
| 4,295,167 | 10/1981 | Wiggins | 358/285 |
| 4,314,281 | 2/1982 | Wiggins et al. | 358/280 |
| 4,506,301 | 3/1985 | Kingsley et al. | 358/280 |
| 4,509,074 | 4/1985 | Krauss et al. | 378/98.7 |
| 4,969,172 | 11/1990 | Marinus | 378/149 |

FOREIGN PATENT DOCUMENTS

| 0324925 | 7/1989 | European Pat. Off. . |
| 0333276 | 9/1989 | European Pat. Off. . |
| 3315882 | 11/1984 | Germany . |
| 5887971 | 5/1983 | Japan . |
| 6012874 | 1/1985 | Japan . |
| 8605056 | 8/1986 | WIPO . |
| 9015501 | 12/1990 | WIPO . |

Primary Examiner—Paul M. Dzierzynski
Assistant Examiner—David Vernon Bruce
Attorney, Agent, or Firm—Jack D. Slobod

[57] ABSTRACT

Compensating for vignetting (loss of brightness at the edge of an image) is achieved by electronically multiplying the pixel-values of the vignetted image by a gain characteristic so as to obtain an unperturbed image. A gain characteristic pertaining to a particular vignetting effect is formed by a set of correction factors for all pixels. These correction factors are obtained from the image of an object having a spatially homogeneous brightness distribution. Various gain characteristics can be stored so that vignetting is compensated for even when the adjustments of the imaging system are varied. When, in order to improve spatial resolution, the image formed on the output screen of an image intensifier in an x-ray examination apparatus is split into two sub-images which are subsequently recombined, the vignetting effects in either of the sub-images are inevitably different due to the use of a beam splitter. The vignetting is decomposed into vignetting effects in a horizontal and in a vertical direction in the recombined image. Correction for vignetting is achieved by multiplying decomposition factors pertaining to horizontal and to vertical vignetting.

19 Claims, 6 Drawing Sheets

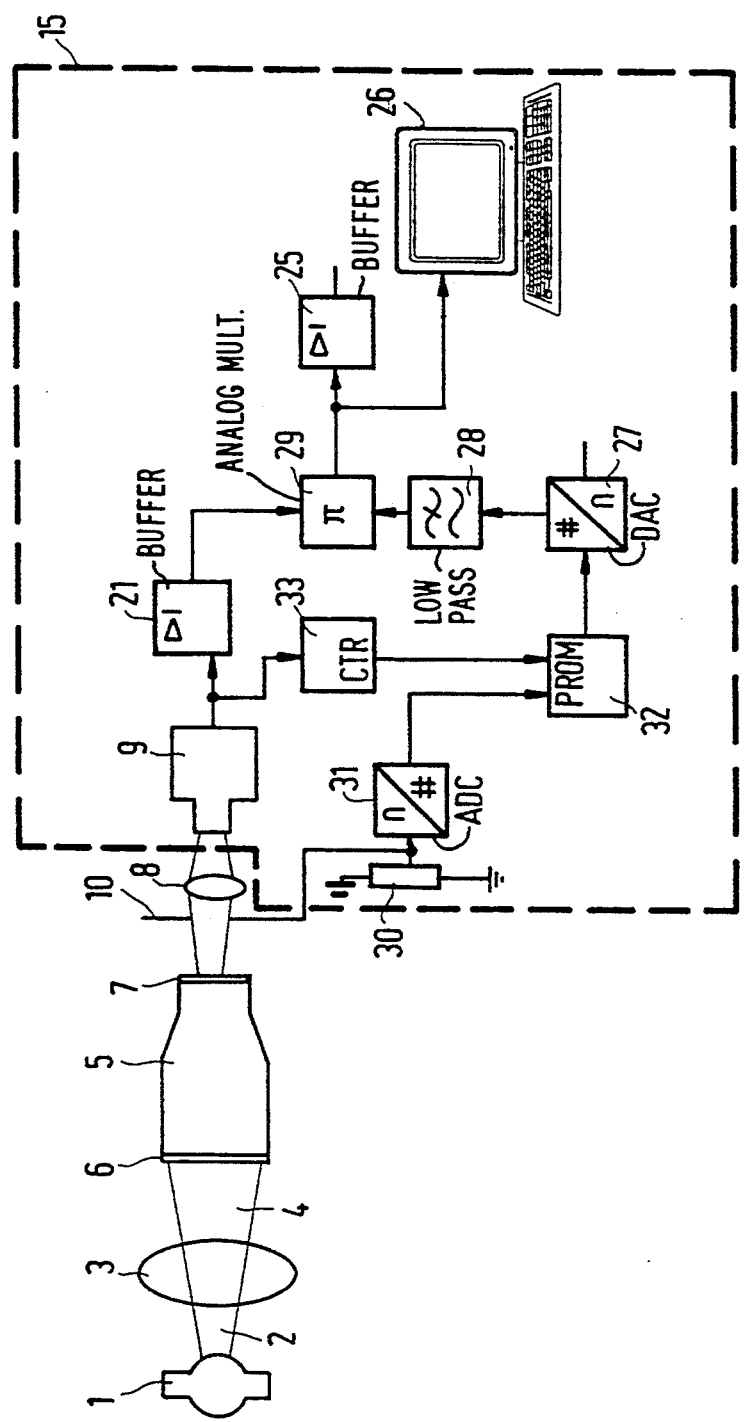

IMAGING SYSTEM WITH MEANS FOR COMPENSATING VIGNETTING AND X-RAY EXAMINATION APPARATUS COMPRISING SUCH AN IMAGING SYSTEM

BACKGROUND OF THE INVENTION

1. Field of the Invention

The invention pertains to an imaging system comprising means for compensating vignetting in an image supplied by an image generation means. The invention also ,elates to an x-ray examination apparatus comprising such imaging system.

An x-ray examination apparatus comprising an imaging system of said kind has been described in the European Patent Application EP 0 333 276 which corresponds to commonly owned U.S. Pat. No. 4,969,176.

Loss of brightness towards a periphery of an image (vignetting) is particularly likely to occur in a lens system containing beam-stops or tandem-sets of lenses. In medical x-ray radiography various further origins of vignetting are known, e.g. variations in intensity in an x-ray beam emitted by an x-ray source, the geometry of the x-ray detection screen, e.g. an input screen of an x-ray image intensifier or the substantially cylindrical shape of a patient to be examined. Vignetting is an image perturbation causing disturbing artifacts or which in medical x-ray images impairs diagnostic quality of an x-ray image. In the x-ray examination apparatus as described in the cited European Patent Application, vignetting is avoided by employing a scatter radiation grid having a transitivity which increases towards the periphery of the x-ray image. The transitivity profile of said scattered-radiation grid is fixed, so that optimum suppression of vignetting is achieved only for a particular set of conditions for generating an image.

SUMMARY OF THE INVENTION

It is inter alia an object of the invention to provide an imaging system having means for accurate compensation of vignetting, which can also be sustained when the circumstances are varied under which images are generated.

To achieve this, an imaging system in accordance with the invention is characterised in that the imaging system comprises pixel-value amplification means for amplifying pixel-values of the image in relation to a decrease of brightness due to an image perturbation.

The present invention is particularly suitable for application in an imaging system that supplies an image that is built up from separate picture elements (pixels). A video signal representing an image consists of signal amplitudes, e.g. voltages, for each of the pixels, each signal amplitude corresponding to the brightness of the relevant pixel in the image. Signal amplitudes constituting a video signal representing an image are to be referred to hereinafter as 'pixel-values'. Sometimes, an image perturbation appearing as a decrease of brightness towards a periphery of the image is termed vignetting. It is to be noted that in an imaging system in accordance with the invention, a correction is performed for a perturbation, in that from an object having a spatially homogeneous brightness distribution an image containing static brightness variations is formed; hereinafter the term vignetting is intended to comprise all such static brightness variations.

When in an image the brightness varies towards the periphery of the image, the pixel-values thus also vary towards the periphery of the image; this variation of the pixel values is to be distinguished from variations that correspond to brightness variations constituting picture information in an unperturbed image. The vignetted image is to be considered to consist of pixel-values that are each a product of the pixel-value pertaining to the unperturbed image and an attenuation factor. This insight provides a basis for compensating an image for vignetting in an imaging system in accordance with the invention.

An imaging system according to the invention has as a specific advantage that accurate compensation can be achieved for a wide variety of imaging circumstances, each of which giving rise to a particular vignetting effect. The value of each pixel for the unperturbed image is obtained by amplifying the corresponding pixel value in the vignetted image by a correction factor that equals a reciprocal of the value of the attenuation coefficient for the pixel at issue. The set of attenuation coefficients corresponding to each of the pixels in the image is obtained by making an image of an object that has a spatially homogeneous brightness distribution. For each of the pixels, the attenuation coefficient is obtained as a ratio of the pixel-value at issue and a maximum pixel-value that is present in the picture. Subsequently, the amplification factors for compensating vignetting are obtained as the reciprocal values of the corresponding attenuation coefficients.

A preferred embodiment of an imaging system in accordance with the invention is characterised in that said amplification means are arranged as multiplication means for computing corrected pixel-values by multiplying pixel-values by electronically provided correction factors.

When amplification of pixel-values of a perturbed image is performed by multiplying pixel-values of a perturbed image by correction factors that are provided electronically, an advantage is achieved in that compensation of vignetting is performed accurately for a variety of imaging circumstances; viz. providing correction factors electronically yields flexibility for adapting values of relevant correction factors.

A further preferred embodiment of an imaging system in accordance with the invention is characterised in that the imaging system comprises electronical memory means for storing correction factors.

A practical way of providing means for electronically providing correction factors consists of providing electronic memory means for storing correction factors. Compensation for vignetting is performed by multiplying pixel-values of the perturbed image by correction factors supplied from said electronic memory means.

A further preferred embodiment of an imaging system in accordance with the invention, wherein said multiplication means is arranged as analog multiplication means, said memory means is arranged for digitally storing correction factors and the imaging system comprises a digital-to-analog converter arranged for converting digital correction factors into analog correction factors, is characterised in that the imaging system comprises a low-pass filter for smoothing step-like variations between analog correction factors pertaining to successive pixels in the image.

Practical electronic memory means are arranged for digitally storing numbers, such as correction factors for compensating vignetting. When analog electronic multiplication of pixel-values by correction factors is performed, correction factors stored in digital form should be converted into analog form and to avoid step-like perturbations in the image that is compensated for vignetting, a low-pass filter is used to smoothen step-like variations between correction factors in analog form pertaining to successive pixels.

A further preferred embodiment of an imaging system in accordance with the invention, wherein said multiplication means is arranged as digital multiplication means, said memory means is arranged for digitally storing correction factors and the imaging system comprises a digital-to-analog converter arranged for converting digital corrected pixel-values into analog corrected pixel-values is characterised in that the imaging system comprises a low-pass filter arranged for smoothing step-like variations between analog corrected pixel-values pertaining to successive pixels of the image.

When digital multiplication of digital forms of pixel-values with digital forms of correction factors is performed, then pixel-values for a corrected image result having digital form. In order to avoid step-like perturbations in the corrected image to be displayed by employing pixel-values pertaining to a corrected image, converted into analog form, a low-pass filter is used to smoothen step-like variations between correction factors in analog form pertaining to successive pixels.

A further preferred embodiment of an imaging system in accordance with the invention is characterised in that said memory means is arranged for storing correction factors for groups of pixels of the image.

Often, a vignetting phenomenon consists of deviations from uniform brightness which vary only over areas in the image containing several pixels. As a consequence, the correction factors needed for compensating vignetting are substantially the same for groups of neighbouring pixels. In a preferred embodiment of a device according to the invention correction factors are stored in the memory means only for groups of pixels rather than for each individual pixel. This preferred embodiment has an advantage of storing correction factors efficiently.

A further preferred embodiment of an imaging system in accordance with the invention is characterised in that said groups are constituted by pixels having a fixed distance from a centre of the image.

Vignetting phenomena have often the property that the associated attenuation coefficients depend on a position of a pixel in the image as a function only of a radial distance between the relevant pixel and a centre of the image. That is, the vignetting pertains to a rotationally symmetric brightness gradient in the perturbed image. Then, the corresponding correction factors depend on a position of a pixel in the image only as a function of the radial distance in the image.

A further preferred embodiment of an imaging system in accordance with the invention is characterised in that said memory means is arranged for storing first correction factors for pixels on a predetermined line in the image and for storing second correction factors for lines in the image parallel to said predetermined line and in that said multiplication means is arranged for multiplying pixel-values by first correction factors and by second correction factors.

Vignetting phenomena have often the property that the associated attenuation coefficients vary along lines in the image and that said variation is substantially the same along each parallel line in the image. Then compensation for vignetting is achieved by multiplying pixel-values pertaining to a perturbed image by a first correction factor and by a second correction factor. Said first correction factor acts as to compensate for vignetting along a central line in the x-ray image on which a pixel at issue lies; said second correction factor acts as to compensate for differences in the vignetting along lines parallel to the central line from vignetting along said central line.

A further preferred embodiment of an imaging system in accordance with the invention is characterised in that said memory means is arranged for storing a plurality of sets of correction factors, each of said sets pertaining to a parameter setting of the imaging system, and in that the imaging system comprises signal production means for producing discrimination signals, each of said discrimination signals pertaining to a parameter setting for selecting a set of correction factors.

Vignetting phenomena may depend on various adjustments of the imaging system, e.g. the setting of apertures. Therefore, so as to sustain correction for vignetting, a different set of correction factors may have to be chosen upon variation the adjustments of the imaging system. Therefore, a plurality of sets of correction factors should be available. This is achieved in an imaging system according to the invention, by storing in said memory means a plurality of sets of correction factors, each of said sets pertaining to a parameter setting of the imaging system, and in that said device comprises signal production means for producing signals, each of said signals pertaining to a parameter setting for selecting a set of correction factors.

A further preferred embodiment of an imaging system in accordance with the invention is characterised in that said memory means is arranged for storing numerical elements and further comprises conversion means for converting positions of pixels in the image into distances between relevant pixels and one point in the image, and calculation means for computing correction factors as a value of predetermined mathematical functions in said distances, said predetermined mathematical functions being further determined by numerical element being stored in said memory means.

When the correction factors for compensating vignetting are a function of the radial distance, such a function can often be fairly well approximated by a mathematical function of the radial distance, said mathematical function having further parametric dependencies. In particular, correction factors that are a function of the radial distance can be calculated to good approximation by functions representing e.g. a Gaussian or a Lorentzian profile, where the height and width of such profiles can be varied by varying the values of corresponding parameters on which said functions depend. Therefore relatively few numbers, viz. values of relevant parameters representing said profiles, have to be stored.

A further preferred embodiment of an imaging system in accordance with the invention is characterised in that said predetermined mathematical functions are polynomial functions and said numerical elements are polynomial coefficients.

When the correction factors for compensating vignetting are a function of the radial distance, such a function can often be fairly well approximated by a polynomial function in the radial distance. Therefore relatively few numbers, viz. polynomial coefficients, have to be stored in a device according to the present embodiment.

A further preferred embodiment of an imaging system in accordance with the invention is characterised in that said memory means is arranged for storing a plurality of sets of numerical elements, each of said sets pertaining to a parameter setting of the imaging system and/or of the image generation means, the imaging system comprising signal production means for producing discrimination signals, each of said discrimination signals pertaining to a parameter setting for selecting a set of numerical elements.

Compensation of various rotationally symmetric vignetting effects, each of them associated with a respective adjustment of the imaging system can be achieved according to the present preferred embodiment by providing various sets of values for parameters determining a function for calculating a correction factor, each set being in correspondence with a particular parameter setting of the image system or of the image rendering system.

A further preferred embodiment of an imaging system in accordance with the invention :also comprising beam splitting means for splitting an image carrying radiation beam into a plurality of sub-image carrying radiation beams, and comprising a multitude of image sensors for recording each of the sub-images, and comprising recombination means for recombining sub-images into a recombined image, is characterised in that the imaging system comprises memory means for storing a plurality sets of correction factors and in that said amplification means are arranged as multiplication means for computing corrected pixel-values by multiplying pixel-values by correction factors selected from said sets of correction factors.

An imaging system comprising a beam splitter for splitting an image into two sub-images, two opto-electronic sensors for detecting the sub-images and means for recombination of the two sub-images into a recombined image with improved spatial resolution is known per se from the German Offenlegungsschrifi DE 33 15 882. That disclosure pertains to an imaging system particularly devised for medical x-ray examinations.

For improving spatial resolution, the use of a beam splitter and two optoelectronic sensors has been proposed in the cited reference. In an x-ray examination apparatus as described in the German Offenlegungsschrifi DE 33 15 882, an image is generated by absorption modulation of x-radiation in the irradiated object, e.g. a patient. Subsequently, a visible image is generated on the output screen of an image intensifier. The image formed on the output screen of the image intensifier is detected by two opto-electronic sensors. More specifically, by a beam splitter the light emitted from the output screen is split into two parts, viz. a transmitted part and a reflected past. The transmitted part is detected by a first opto-electronic sensor, the reflected part is detected by a second opto-electronic sensor. The optoelectronic sensors are arranged in such a way that the picture elements (pixels) of a complete image on the output screen of the image intensifier, collected by the first sensor are located in interstices between the pixels collected by the second sensor. Hence, a complete image is divided into two sub-images that are mutually shifted over half a distance between two adjacent pixels in either of the sub-images. Subsequently, both sub-images are recombined, so that a full image results which has an improved spatial resolution.

Vignetting constitutes a particular problem in imaging systems comprising two-optoelectronic sensors as described above. Because the reflected part of the light and the transmitted part of the light traverse different optical paths, the images formed from the transmitted light and from the reflected light, respectively, have different vignetting phenomena.

In an imaging system in accordance with the invention, vignetting is compensated for by providing correction factors for pixels of the recombined image. Because in each of the sub-images are subject to different vignetting phenomena, subsets of correction factors, each of the pertaining to a said sub-image are provided for adequately compensating for vignetting in the recombined image.

A further preferred embodiment of an imaging system in accordance with the invention, also comprising beam splitting means for splitting an image carrying radiation beam into a plurality of sub-image carrying radiation beams, and comprising a multitude of image sensors for recording each of the sub-images, and comprising recombination means for recombining sub-images into a recombined image, is characterised in that a said beam splitting means is constituted by a single beam-splitter for splitting an image into two sub-images, further characterised in that said memory means is arranged for storing a first set of correction factors for compensating vignetting in first direction in the recombined image and for storing a second set of correction factors for compensating vignetting in a second direction in the recombined image.

A preferred way of increasing spatial resolution is to employ two sub-images wherefrom a recombined image is formed having improved spatial resolution. By splitting the image carrying radiation by means of a beam splitter into a first sub-image carrying radiation and a second sub-image carrying radiation and recording the first and second sub-image with two respective opto-electronic sensors being aligned such that the pixels of a first optoelectronic sensor correspond to interstices of a second optoelectronic sensor. A recombined image is subsequently formed from the sub-images recorded by the respective optoelectronic sensors. Because of the use of a beam splitter and because of differences between sensitivities of the optoelectronic sensors a recombined image contains in intricate vignetting pattern. Such a vignetting pattern is compensated in an imaging system in accordance with the invention by multiplying pixel values of the recombined image by correction factor provided from a memory means, for compensating a decrease in brightness due to vignetting.

An x-ray examination apparatus wherein vignetting is compensated preferably comprises an imaging system in accordance with the invention. In medical x-ray radiography various further origins of vignetting in an x-ray image are known, e.g. variations in intensity in an x-ray beam emitted by an x-ray source, the geometry of the x-ray detection screen, e.g. an input screen of an x-ray image intensifier or the substantially cylindrical shape of a patient to be examined. The vignetting of the x-ray image is transferred to a visible image when the x-ray image is transformed into a visible image, e.g. by an x-ray image intensifier. Such image perturbations are compensated by an imaging system in accordance with the invention to the accompanying drawings.

BRIEF DESCRIPTIONS OF THE DRAWING

These and other aspects of the invention will become apparent from and elucidated with reference to the embodiments described hereinafter and with reference FIG. 1a shows a block diagram of an embodiment of an x-ray examination apparatus comprising an imaging system in accordance with the invention.

FIG. 2b shows a gain characteristic for a radially symmetric vignetting phenomenon as shown in FIG. 2a.

Figure 3A:
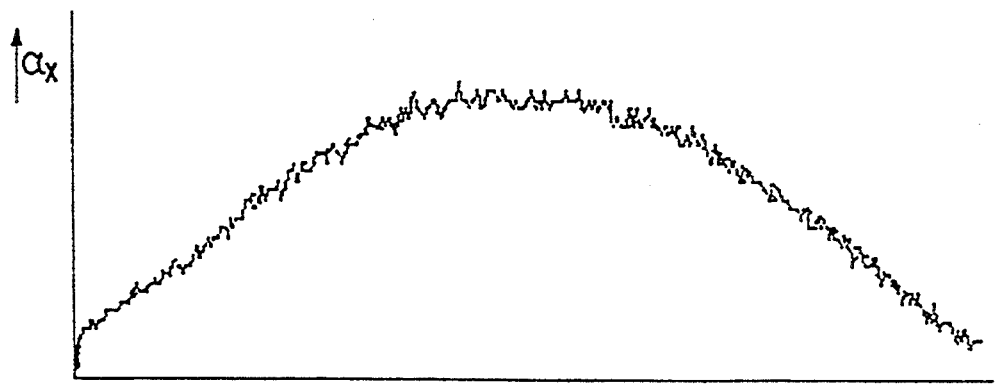
Figure 3B:
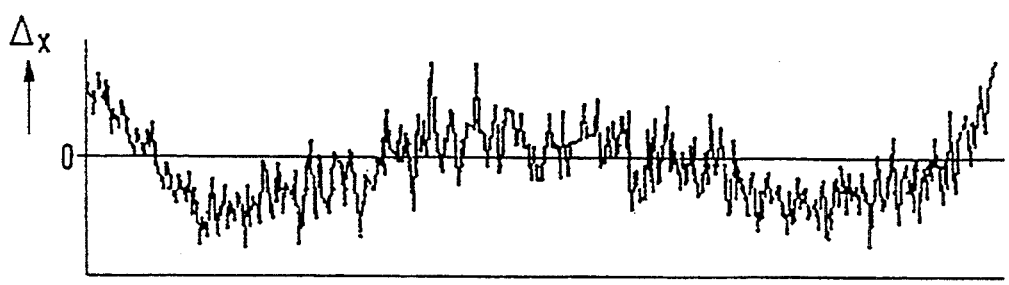
Figure 3C:
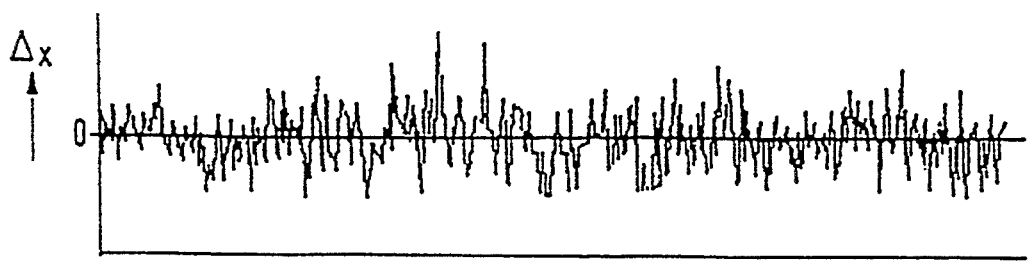

FIGS. 3a–c show comparisons of attenuation coefficients with two polynomial approximations.

Figure 4A:
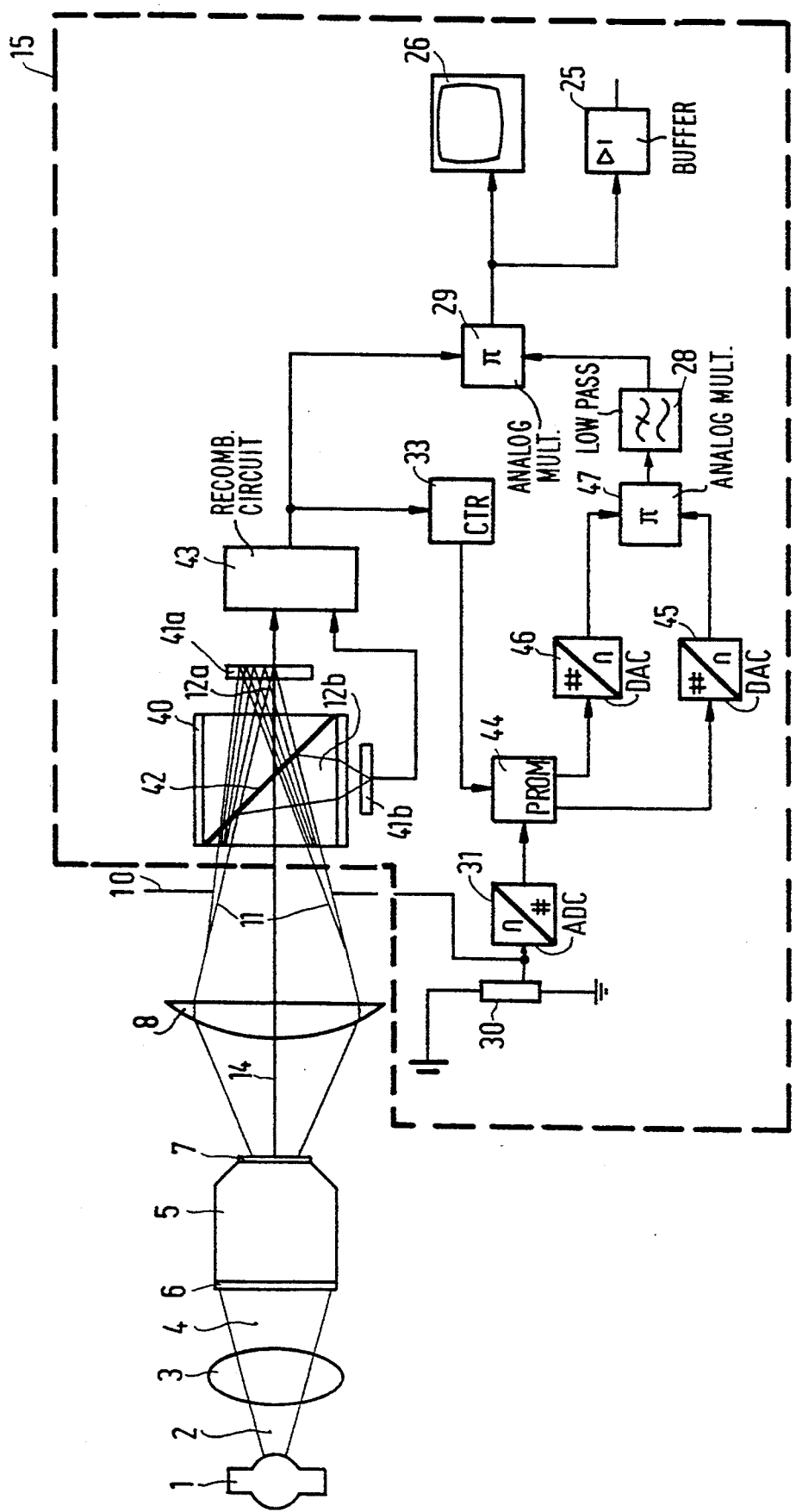

FIG. 4a shows a block diagram of an embodiment of an x-ray examination apparatus comprising an imaging system in accordance with the invention, comprising means for splitting an image into sub-images and subsequently recombining said sub-images.

Figure 4B:
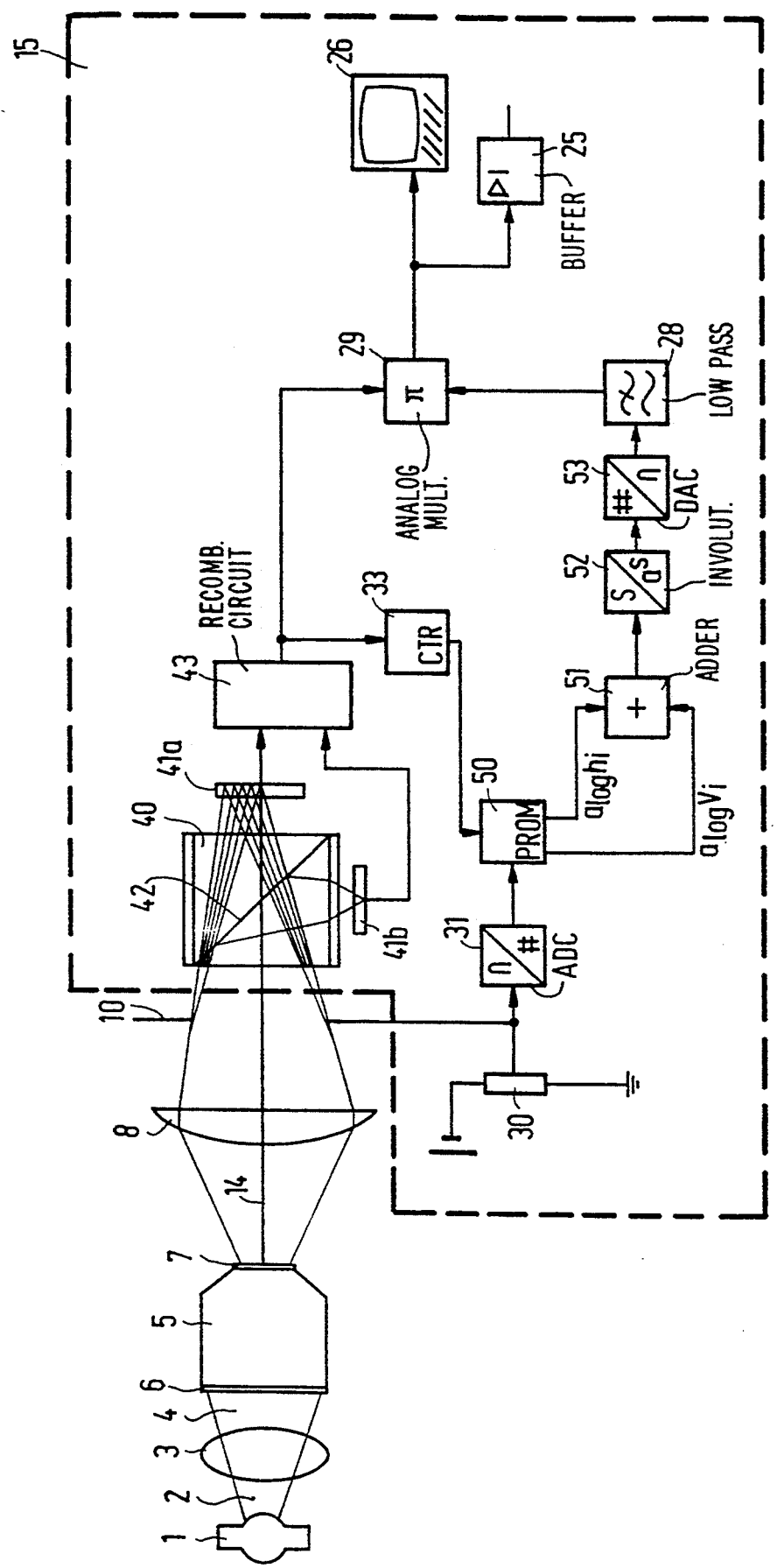

FIG. 4b shows a block diagram of another embodiment of an x-ray examination apparatus comprising an imaging system in accordance with the invention, comprising means for splitting an image into sub-images and subsequently recombining said sub-images.

DETAILED DESCRIPTION OF THE PREFERRED EMBODIMENTS

Figure 1A:
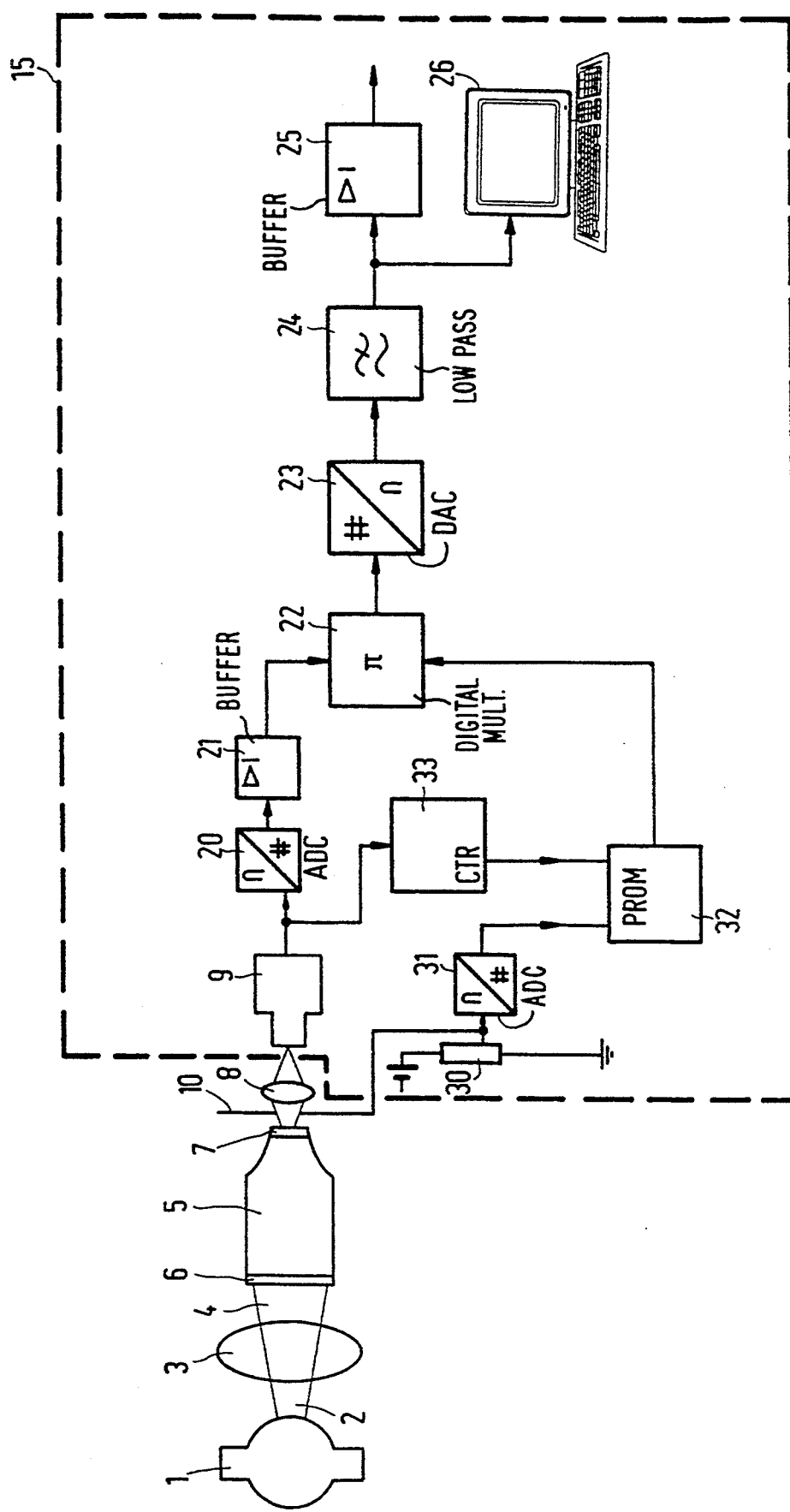
FIG. 1b shows a block diagram of another embodiment of an x-ray examination apparatus comprising an imaging system in accordance with the invention.

FIG. 1a shows a block diagram of an embodiment of an x-ray examination apparatus comprising an imaging system 15 in accordance with the invention. An x-ray source 1 is provided for generating a beam of x-rays 2 which is directed to an object 3, e.g. a patient. The x-rays are attenuated by the object and the attenuated x-radiation 4 is collected by an x-ray image intensifier 5 having an input screen 6 and an output screen 7. An x-ray image collected on said input screen is converted into a visible image on the output screen. By means of an optical arrangement 8 said visible image is imaged onto a video camera 9, whereby the visible image is converted into an electrical analog video signal. Illumination of the video camera is controlled by a diaphragm 10. Thus an image generation means is formed by the x-ray source 1 together with the x-ray image intensifier 5. The image which is produced is supplied to the video camera of the imaging system 15 by means of the optical arrangement 8. The analog video signal is converted into a digital video signal by means of an analog-to-digital converter 20 and the digital video signal is supplied to a buffer circuit 21. Gain characteristics consisting of correction factors for compensating vignetting are digitally stored in a memory-means, notably a programmable read-only memory (PROM) 32. A plurality of gain characteristics is provided, each gain characteristic pertaining to a set of imaging parameters, each such set being related to a particular vignetting pattern. In particular the opening of the diaphragm 10 is of relevance for selecting an appropriate gain characteristic. By means of a potentiometer 30 an analog diaphragm-signal is formed in correspondence with the opening of the diaphragm. By means of a further analog-to-digital converter 31, said analog diaphragm-signal is converted into a digital diaphragm-signal, which in turn is supplied to the PROM 32 for selecting a relevant gain characteristic. Selecting a relevant correction factor from the selected gain characteristic is performed by means of a counter 33. A multiplication means in the form of a digital multiplier 22 performs multiplication of a digital pixel-value supplied from the buffer circuit 21 and a corresponding digital correction factor supplied from the PROM 32. The digital multiplier 22 outputs a digital corrected video signal which is subsequently supplied to a digital-to-analog converter 23 for transforming into an analog corrected video signal. Owing to digital-to-analog conversion the analog corrected video signal can comprise step-like perturbations with are removed by smoothing the analog corrected video signal by means of a low-pass filter 24. The smoothed analog corrected video signal, pertaining to an image compensated for vignetting, generated by the low-pass filter 24 is finally supplied to an output buffer circuit 25 for further processing of the image, or to a monitor 26 for viewing the image. Thus, amplifying pixel in relation to a decrease in brightness due to an image perturbation and thereby compensating vignetting is achieved in accordance, with the invention in that pixels of a perturbed image are multiplied by correction factors. Therefore, multiplication means, such as e.g. a digital multiplier 22 and means for compensating vignetting are constituted by said multiplication means together with the memory means 32, counter 33, analog-to-digital converter 31 and potentiometer 30 for selecting a relevant correction factor, and low-pass filter 24 for avoiding step-like perturbations. Said potentiometer 30 and the analog-to-digital converter constitute a signal production means for producing a discriminator signal via said digital diaphram signal.

FIG. 1b shows a block diagram of another embodiment of an x-ray examination apparatus comprising an imaging system 15 in accordance with the invention. The analog video signal generated by the video camera 9 is supplied to the buffer circuit 21. A correction factor is selected from the PROM 32 by way of a digital diaphragm signal provided by the analog-to digital converter 31 and the counter 33. A digital-to analog converter 27 transforms the selected digital correction factor into an analog correction factor. To avoid step-like perturbations, a sequence of analog correction factors, corresponding to sequences of pixels, i.e. a gain characteristic is smoothed by means of a low-pass filter 28. The analog video signal and a smoothed gain characteristic as supplied by the low-pass filter, are multiplied in the sense that pixel-values of the analog video signal are multiplied by analog correction factors of a smoothed gain characteristic, by a multiplication means in the form of an analog multiplier 29 which forms a corrected analog video signal pertaining to an image being compensated for vignetting. The corrected analog video signal is supplied to the output buffer circuit 25 for further processing of the image or to the monitor 26 for viewing the image.

Figure 2A:
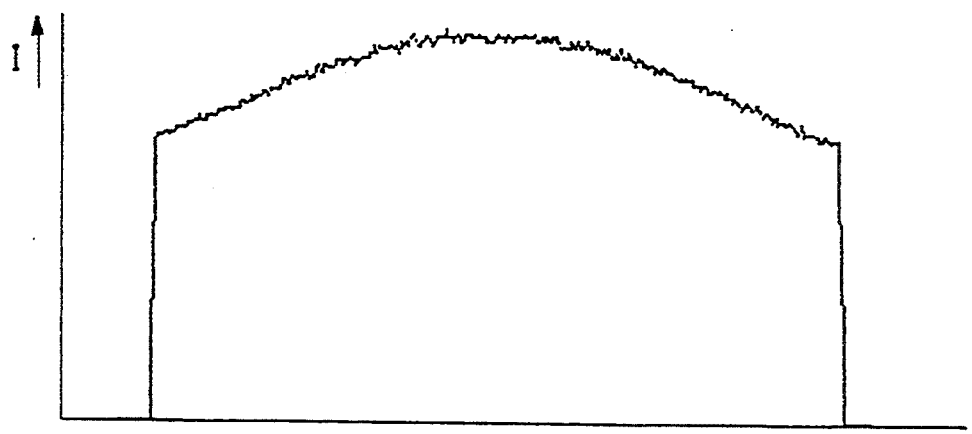
FIG. 2a is a graphical representation of a decrease of brightness pertaining to a radially symmetric vignetting phenomenon, as a function of the radial distance from the centre of the image.

FIG. 2a is a graphical representation of a decrease of brightness pertaining to a radially symmetric vignetting phenomenon, as a function of the radial distance front the centre of the image. FIG. 2a shows a graph in which the intensity I in the image is plotted as a function of position x along a horizontal line in the image, as it is produced by the imaging system without compensation for vignetting, of an object having a homogeneous brightness distribution. As appears form the figure, the intensity decreases gradually towards the edges of the image. In addition the graph contains much more rapid fluctuations of the intensity that are caused by various noise sources of the imaging system.

Figure 2B:
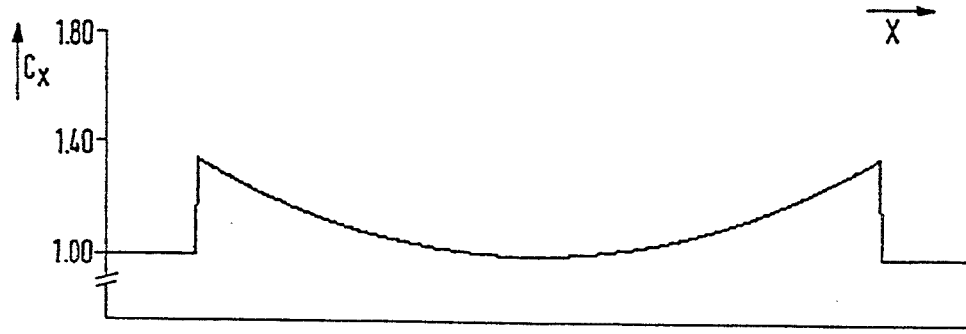

FIG. 2b shows a gain characteristic for a radially symmetric vignetting phenomenon as shown in FIG. 2a. In FIG. 2b a graph is presented for a gain characteristic pertaining to the vignetting effect shown in FIG. 1a. Specifically, the values for the relevant correction factors $C_x$ are plotted as a function of position x along a horizontal line in the image.

Figure 2C:
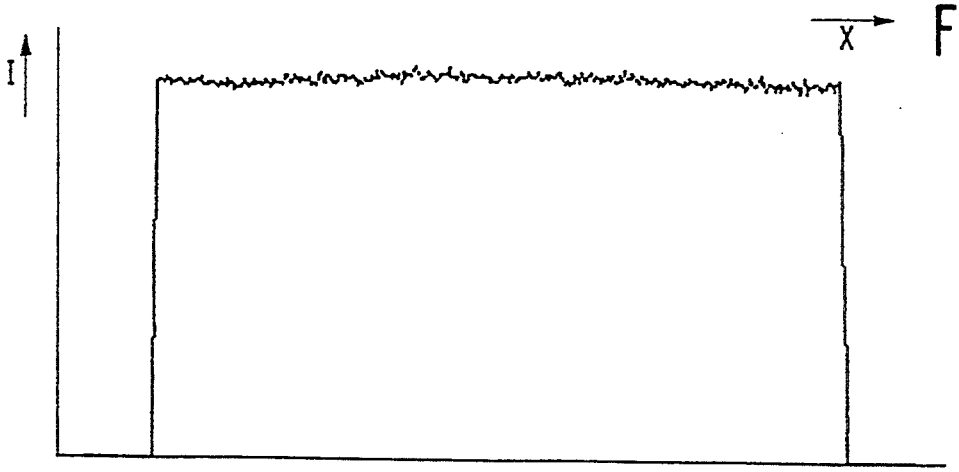
FIG. 2c shows the pixel-values as a function of the radial distance after compensating for the vignetting as shown in FIG. 2a, by employing the gain characteristic of FIG. 2b.
Figure 2D:
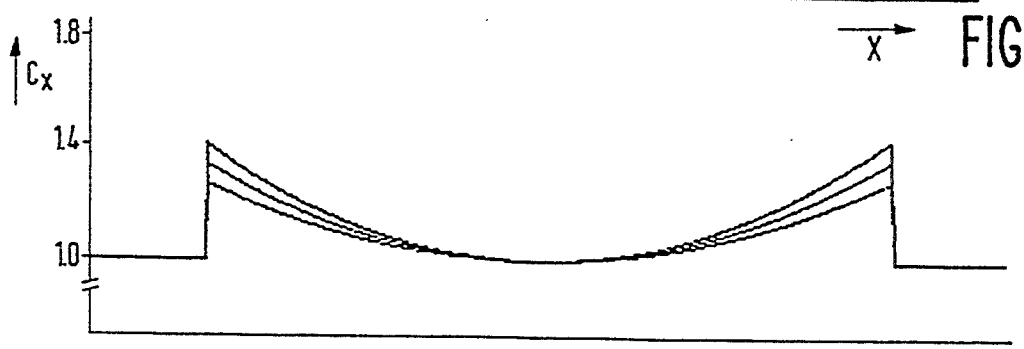
FIG. 2d shows a set of gain characteristics pertaining to various parameter settings.

FIG. 2c shows a graph the intensity I in the image as a function of the position x along a horizontal line for the image derived from the image of which a line is shown in FIG. 1a after compensation for vignetting on the basis of the correction factors presented in FIG. 1b, employing the method of the invention. It is clear that the vignetting effects have been accurately compensated for and that only the fluctuations pertaining to noise have remained.

In FIG. 3d an example is presented for a plurality of gain characteristics (A–C), each of which relates to a different vignetting phenomenon.

FIGS. 3a–c show comparisons of attenuation coefficients with two polynomial approximations. The use of polynomial approximations for attenuation factors is further illustrated in FIGS. 3a–c. The graph of FIG. 3a represents an attenuation factor $a_x$ as a function of the position x along a horizontal line in the image. The attenuation factor can be approximated by a second order polynomial in a distance of the relevant pixel to the centre of the image. The polynomial coefficients are determined by employing a best-fitting procedure. For further comparison, in FIG. 3b a residual error is presented as a function of the position along a horizontal line in the image; i.e. for each position along a horizontal line the difference between the attenuation factor and the value of its approximation by a best-fitting second-order polynomial is plotted.

FIG. 3b shows that the residual error in the approximation of the attenuation factor as a function of position along a horizontal line in the image by a best-fitting second-order polynomial still contains a slowly varying component. This implies that the vignetting effects will not be fully compensated when the second order polynomial approximation is used for the attenuation factors.

The use of polynomial approximations for attenuation factors is still further illustrated in FIG. 3c in that it is demonstrated that employing higher order polynomial approximations are more accurate. For further comparison, in FIG. 2c a residual error is presented as a function of the position along a horizontal line in the picture; i.e. for each position along a horizontal line the difference of the attenuation factor and the value of its approximation by the best fitting fourth order polynomial is plotted. FIG. 3c shows that the residual error in the approximation of the attenuation factor as a function of position along a horizontal line in the image by a best-fitting fourth-order polynomial approximation is slightly smaller in magnitude as compared to the residual errors presented in FIG. 3b for the case of a second-order polynomial approximation.. More important is, however, that the fourth-order polynomial approximation leads to a residual error that does not contain an appreciable slowly varying component. Therefore, fully compensating vignetting effects is achieved when correction factors are used that are obtained as the reciprocal of an approximation of attenuation coefficient by a best fitting fourth order polynomial in the distance between the relevant pixel and the centre of the image.

FIG. 4a shows a block diagram of an embodiment of an x-ray examination apparatus comprising an imaging system 15 in accordance with the invention, comprising means for splitting an image into sub-images and subsequently recombining said sub-images. The image carrying light beam 11 emanating from the output screen of the x-ray image intensifier is split into a transmitted sub-image carrying light beam 12a and a reflected sub-image carrying light beam 12b, respectively, by means of a beam-splitter 40. The beam-splitter can have the form of two adjacent prisms, constituting a partial reflector 42 at the interface between the prisms, as are shown in FIG. 4a, or a partially reflecting mirror can be employed as a beam-splitter. The sub-image carrying light beams are focused onto respective opto-electronic sensors 41a and 41b, respectively. The opto-electronic sensors 41a,b are aligned such that pixels of the transmitted sub-image as recorded by the opto-electronic sensor 41a are located at interstices between pixels of the reflected sub-image as recorded by the opto-electronic sensor 41b. By recombining the reflected sub-image and the reflected sub-image into a recombined image a total image having improved spatial resolution results. Recombination of the electronical signals generated by the opto-electronic sensors, in correspondence to respective sub-images is performed by means of a recombination circuit 43, which produces a video signal pertaining to the recombined image. E.g. a recombined image is built up such that even lines in the recombined picture originate from the transmitted sub-image and odd lines originate from the reflected sub-image. Another way of forming a recombined image is to alternately select pixels from either sub-image. Light emanating from various points on the output screen 7 of the x-ray image intensifier 5 propagates to the partial reflector 42 as conical diverging beams having cones of different opening angles. Notably, the opening angle differs of such cones emanating from respective points on the output screen 7 offset from the optical axis 14 perpendicularly to the plane of the partial reflector 42 is different. Because Fresnel reflectivities and transmittances are not symmetric functions of the angle of incidence around 45° incidence and moreover because absorption that occurs at the partial reflector, is dependent on the angle of incidence, it is inevitable that vignetting in the reflected sub-image differs from vignetting in the transmitted sub-image. In particular, vignetting in a direction along the plane of the perpendicular to the partial reflector is different from vignetting along the plane of the partial reflector. Furthermore, differences in the sensitivities the opto-electronic sensors 41a and 41b add to further complexity of vignetting in the recombined image. Vignetting in the recombined image can be decomposed into brightness variations along two orthogonal directions in the recombined image; e.g. vignetting in the recombined image can be decomposed into vignetting along a vertical direction and vignetting along a horizontal direction.

In an embodiment of an x-ray examination apparatus as presented in FIG. 4a, a complicated vignetting pattern in the recombined image is compensated for. In a memory means, notably a PROM 44, gain characteristics comprising correction factors for compensating horizontal vignetting as well as gain characteristics comprising correction factors for compensating vertical vignetting are stored. Moreover, a plurality of said gain characteristics is stored, each gain characteristic pertaining to an imaging parameter of the x-ray examination apparatus, such as e.g. an opening of the diaphragm 8. The opening of the diaphragm 8 is determined by the potentiometer 30, which supplies an analog diaphragm signal in correspondence with the diaphragm opening to the analog-to-digital converter 31 which subsequently supplies a digital diaphragm signal adding as a discrimination signal to the PROM 44, for selecting relevant gain characteristics. The counter 33 provides a signal to the PROM for selecting relevant correction factors from the selected gain characteristics for compensating horizontal and vertical vignetting respectively. A first correction factor for compensating vertical vignetting is converted into analog format by a digital-to-analog converter 45; a second correction factor is converted into analog format by a digital-to-analog converter 46. The correction factors are multiplied by a further analog multiplier 47, so as to compute a correction factor for compensating vignetting for a pixel in the recombined image. By means of the analog multiplier 29 a pixel value of the recombined image as generated by the recombination circuit 43 is multiplied by the computed correction factor supplied by the analog multiplier 47, and step-like perturbations are avoided by smoothing sequences of correction factors by passing sequences of computed correction factors, corresponding to sequences of pixels, through the low-pass filter 28. The video signal for the recombined image is supplied to the analog multiplier 29 where the video signal is multiplied by correction factors supplied by the low-pass filter 28, so as to form a corrected analog video signal for the recombined image, which is supplied to the monitor 26 for viewing of the recombined image or to the output buffer circuit for further processing.

FIG. 4b shows a block diagram of another embodiment of an x-ray examination apparatus comprising an imaging system 15 in accordance with the invention, comprising means for splitting an image into sub-images and subsequently recombining said sub-images. In the PROM 50, there are stored gain characteristics in that values of logarithms of correction factors are stored. By way of a diaphragm signal supplied by the analog-to-digital converter 31 together with the potentiometer 30 and a selection signal supplied by the counter 33, a value of a logarithm of a correction factor for compensating vertical vignetting is selected from the PROM and supplied to an addition means 51. Similarly, a value of a logarithm of a correction factor is selected and supplied to the addition means or adder 51. After adding logarithms of said correction factor, a connection factor for compensating vignetting in the recombined image is computed by an involution means 52. A gain characteristic computed by the involution means 52 is converted into analog form by a digital-to-analog converter 53 and is subsequently disposed of possible step-like perturbations by smoothing employing the low-pass filter 28. The video signal for the recombined image is supplied to the analog multiplier 29, where the video signal is multiplied by correction factors supplied by the low-pass filter 28, so as to form a corrected analog video signal for the recombined image, which is supplied to the monitor 26 for viewing of the recombined image or to the output buffer circuit for further processing.

I claim:

1. An x-ray examination apparatus comprising an x-ray source for irradiating an object under examination, means for detecting x-ray radiation exiting from said object and for forming therefrom pixel-values comprised by an image of said object, and means for compensating for any vignetting effect in said image, said compensating means comprising pixel-value amplification means for amplifying pixel-values of the image in relation to a decrease in brightness due to an image perturbation.

2. In an imaging system in which pixel-values corresponding to an image are supplied by an image generation means, means for compensating vignetting in said image comprising memory means for storing correction factors, means for receiving, pixel-values from the image generation means, means for receiving correction factors from said memory means, and means for forming corrected pixel-values obtained from a product of multiplying said received pixel-values by values obtained from the correction factors read, wherein the values obtained from the correction factors or the values obtained from the product are obtained by passage through a low-pass-filter.

3. An imaging system as claimed in claim 2, further characterised in that said memory means is arranged for storing first correction factors for pixels on a predetermined line in the image and for storing second correction factors for lines in the image parallel to said predetermined line and in that said values obtained from the correction factors read are obtained from said first correction factors and said second correction factors.

4. An imaging system as claimed in any one of claim 2, further characterised in that said memory means is arranged for storing a plurality of sets of correction factors, each of said sets pertaining to a parameter setting of the imaging system and/or of the image generating means, and in that the imaging system comprises signal production means for producing discrimination signals, each of said discrimination signals pertaining to a parameter setting for selecting a set of correction factors.

5. An imaging system as claimed in claim 2, also comprising beam splitting means for splitting an image carrying radiation beam into a plurality of sub-image carrying radiation beams, and comprising a multitude of image sensors for recording each of the sub-images, and comprising recombination means for recombining sub-images into a recombined image, further characterised in that the imaging system comprises memory means for storing a plurality of sets of correction factors and in that said corrected pixel-values forming means are arranged as multiplication means for computing corrected pixel-values by multiplying pixel-values by correction factors selected from said sets of correction factors.

6. An imaging system as claimed in claim 5, further characterised in that a said beam splitting means is constituted by a single beam-splitter for splitting an image into two sub-images, further characterised in that said memory means is arranged for storing a first: set of correction factors for compensating vignetting in first direction in the recombined image and for storing a second set of correction factors for compensating vignetting in a second direction in the recombined image.

7. An imaging system as claimed in claim 2, further characterised in that said memory means is arranged for storing numerical elements and further comprises conversion means for converting positions of pixels in the image into distances between relevant pixels and one point in the image, and calculation means for computing correction factors as a value of predetermined mathematical functions in said distances, said predetermined mathematical functions being further determined by numerical elements stored in said memory means.

8. An imaging system as claimed in claim 7, further characterised in that said predetermined mathematical functions are polynomial functions and said numerical elements are polynomial coefficients.

9. An imaging system as claimed in claim 7, further characterised in that said memory means is arranged for storing a plurality of sets of numerical elements, each of said sets pertaining to a parameter setting of the imaging system, the imaging system comprising signal production means for producing discrimination signals, each of said discrimination signals pertaining to a parameter setting for selecting a set of numerical elements.

10. An imaging system as claimed in claim 2, further characterised in that said memory means is arranged for storing correction factors for groups of pixels of the image.

11. An imaging system as claimed in claim 10, further characterised in that said groups are constituted by pixels having a fixed distance from a center of the image.

12. An imaging system as claimed in claim 2, wherein said multiplying is performed by a digital multiplier producing corrected pixel-values in digital form as digital corrected pixel-values, said memory means is arranged for storing correction factors in digital form and a digital-to-analog converter is arranged for converting the digital corrected pixel-values into analog form as analog corrected pixel-values, and wherein said low-pass filter arranged for smoothing step-like variations between analog corrected pixel-values pertaining to successive pixels of the image.

13. An imaging system as claimed in claim 12, further characterized in that said memory means is arrange for storing correction factors for groups of pixels of the image.

14. An imaging system as claimed in claim 2, wherein said multiplying is performed by an analog multiplier, said memory means is arranged for storing the correction factors in digital form and a digital-to-analog converter is arranged for receiving the correction factors from the memory in digital form and converting the received correction factors into analog form as analog correction factors pertaining to successive pixels in the image, and wherein said low-pass filter is arranged for smoothing step-like variations between the analog correction factors.

15. An imaging system as claimed in claim 14, further characterized in that said memory means is arranged for storing correction factors for groups of pixels of the image.

16. In an imaging system in which pixel-values corresponding to an image are supplied by an image generation means, means for compensating vignetting in said image comprising memory means storing first correction factors for pixels on a predetermined line in the image and for storing second correction factors for lines in the image parallel to said predetermined line, means for receiving pixel-values from the image generation means, means for receiving correction factors from said memory means, and means for forming corrected pixel-values obtained from a product of multiplying said received pixel-values for pixels on lines in the image by values obtained from the correction factors read applicable to the lines.

17. An imaging system as claimed in claim 16, wherein said corrected pixel-values forming means is arranged as analog multiplication means, said memory means is arranged for digitally storing correction factors and the imaging system comprises a digital-to-analog converter arranged for converting digital correction factors into analog correction factors, further characterized in that the imaging system comprises a low-pass filter for smoothing step-like variations between analog correction factors pertaining to successive pixels in the image.

18. An imaging system as claimed in claim 16, wherein said corrected pixel-values forming means is arranged as digital multiplication means, said memory means is arranged for digitally storing correction factors and the imaging system comprises a digital-to-analog converter arranged for converting digital corrected pixel-values into analog corrected pixel-values, further characterized in that the imaging system comprises a low-pass filter arranged for smoothing step-like variations between analog corrected pixel-values pertaining to successive pixels of the image.

19. An imaging system as claimed in claim 16, further characterized in that said memory means is arranged for storing correction factors for groups of pixels of the image.

* * * * *